United States Patent [19]
Alden et al.

[11] 4,018,985
[45] Apr. 19, 1977

[54] FACSIMILE APPARATUS FOR SCANNING A SELECTED PORTION OF A GRAPHIC RECORD

[75] Inventors: John M. Alden, Needham; George C. Williams, South Easton, both of Mass.

[73] Assignee: Alden Research Foundation, Westboro, Mass.

[22] Filed: Apr. 7, 1975

[21] Appl. No.: 565,865

[52] U.S. Cl. ............................................. 358/285
[51] Int. Cl.² .......................................... H04N 3/02
[58] Field of Search ............... 178/6, 7.1, DIG. 27, 178/7.6, 6.8, 7.2, 7.91; 355/40; 356/71, 167; 250/567; 340/146.3 AH

[56] References Cited
UNITED STATES PATENTS

| | | | |
|---|---|---|---|
| 2,647,945 | 8/1953 | Ridings et al. | 178/DIG. 27 |
| 2,666,094 | 1/1954 | Young | 178/7.1 |
| 3,235,657 | 2/1966 | Fleissner | 178/DIG. 27 |
| 3,265,812 | 8/1966 | Essinger et al. | 178/7.2 |
| 3,457,421 | 7/1969 | Bayha | 356/71 |
| 3,602,643 | 8/1971 | Wright | 178/7.6 |
| 3,886,371 | 5/1975 | Lloyd | 178/7.6 |

*Primary Examiner*—John C. Martin
*Attorney, Agent, or Firm*—James H. Grover

[57] ABSTRACT

A graphic record such as a bank signature card with a signature portion of limited area is registered by a framing clip on a carriage moveable under a photoelectric facsimile line scanner. The carriage is manually moved to an inner, start-of-scan position where it is arrested by a stop and a motor drives it back to its initial outer position past the scanner. The stop is spaced with respect to the carriage the same dimension as the selected signature portion of the card so that only the signature is scanned in a minimum of time. The stop is adjustable out of the carriage path so that the card or other graphic record can be scanned beyond the selected signature portion.

10 Claims, 6 Drawing Figures

FACSIMILE APPARATUS FOR SCANNING A SELECTED PORTION OF A GRAPHIC RECORD

BACKGROUND OF THE INVENTION

This invention relates to photoelectric facsimile transmitters which scan a document or other original graphic record and generate electrical signals similar to line-by-line television signals for reception by a recorder such as an electrolytic facsimile recorder which electrically reproduces the original graphic record. In the facsimile are there are many scanners designed to reproduce records of standard sizes, but there is a need for apparatus for scanning only a portion of original records.

For example, in a banking system when a checking account is opened in one bank branch an authorized signature for withdrawal of checks is subscribed on a signature card by the depositor. However, the depositor's checks may be presented at another bank branch or to a teller remote from the signature card file. In such situations the signature card can be transmitted by facsimile to the teller for comparison of the signatures on the card and on the check. However, normal facsimile transmission of the signature card, even at high transmission speed, is too slow for normal volume of check cashing transactions.

Accordingly one object of the present invention is to provide a facsimile transmitter which eliminates time for transmitting other than a selected portion of a graphic record, such as the signature portion.

A further object is to provide apparatus in which the bank clerk or other operator can easily select the limited portion to be transmitted, and can view the selected area, face up, in position for transmission.

A still further object is to provide a facsimile scanner which can transmit a whole document as well as selected portions thereof.

STATEMENT OF INVENTION

According to the invention facsimile apparatus for producing an electrical signal representative of a limited portion of a graphic record comprises a frame member, means on the frame member for scanning the graphic record, and a carriage member moveable between inner and outer positions on the frame member, the carriage member having framing means for locating the graphic record on a path passing the scanning means, the carriage member being below the scanning means and the framing means being exposed when the carriage is in outer position so that the graphic record is visible face up when located in the framing means by the operator.

Further according to the invention means are provided for adjusting the limiting means from carriage movement limiting position.

Other aspects of the invention will be apparent from the following description.

DRAWINGS

DESCRIPTION

Figure 1:
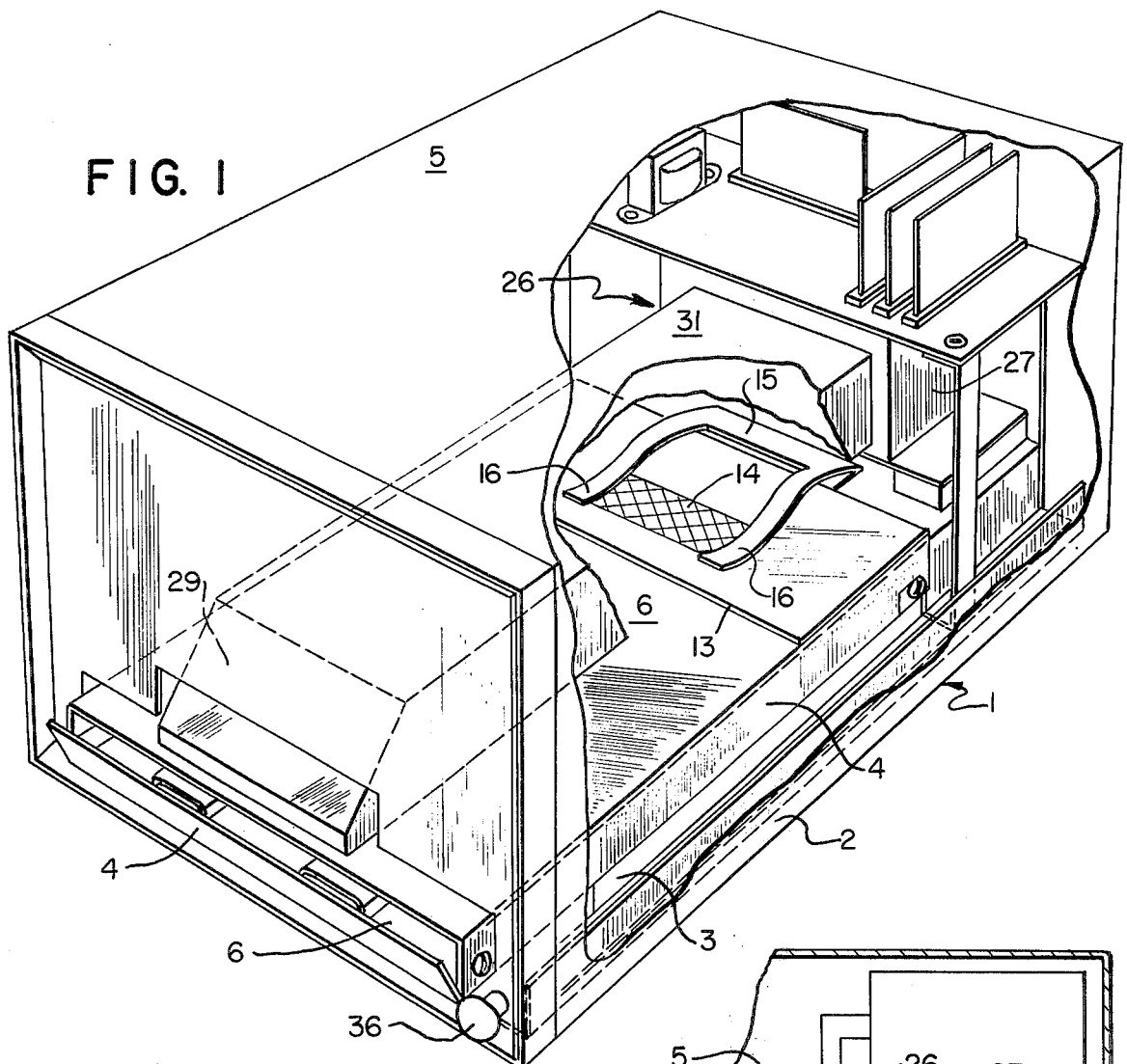
FIG. 1 is an isometric view, partly broken away, of a facsimile transmitter according to the invention with its graphic record carriage at innermost position.
Figure 2:
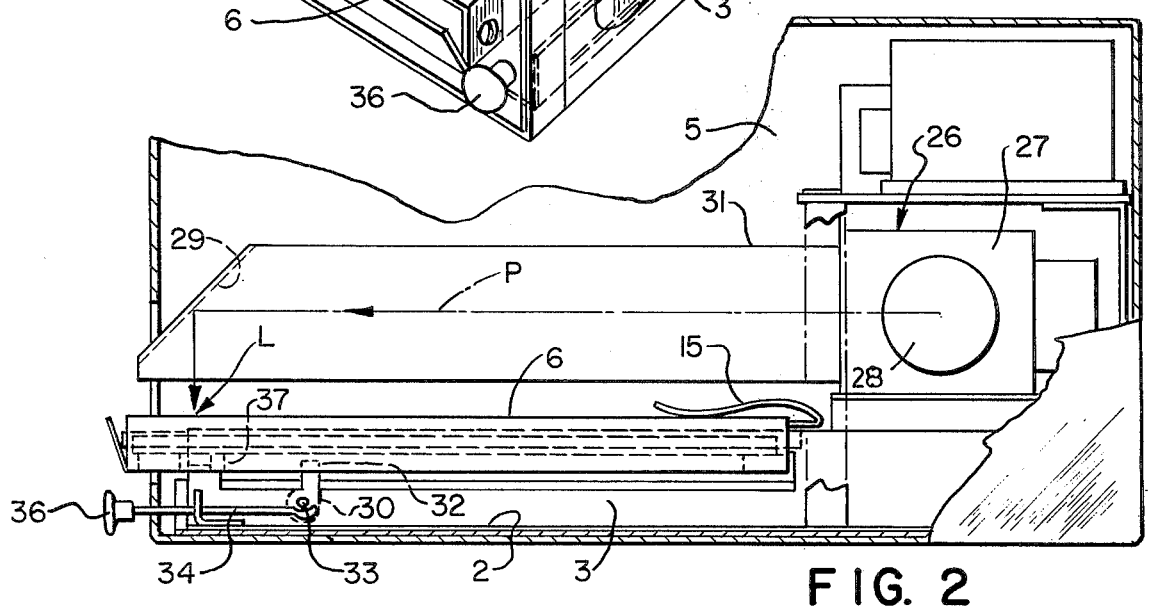
FIG. 2 is a side elevation of the transmitter, partly broken away.
Figure 3:
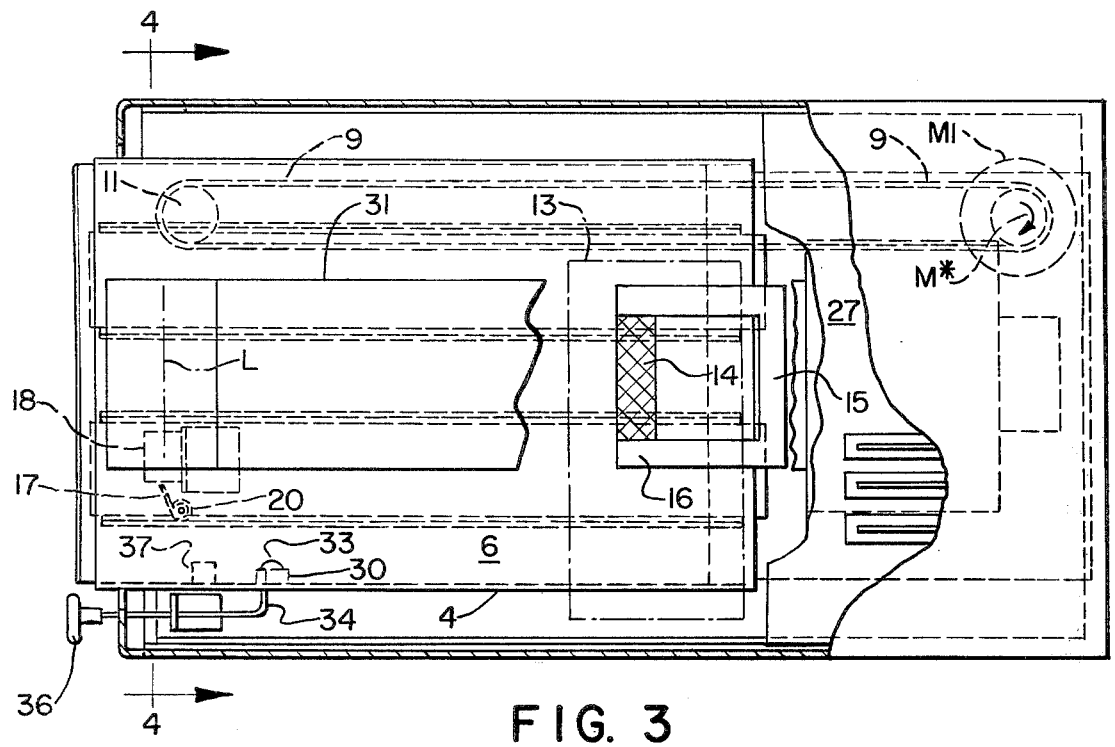
FIG. 3 is a plan view, partly broken away.
Figure 4:
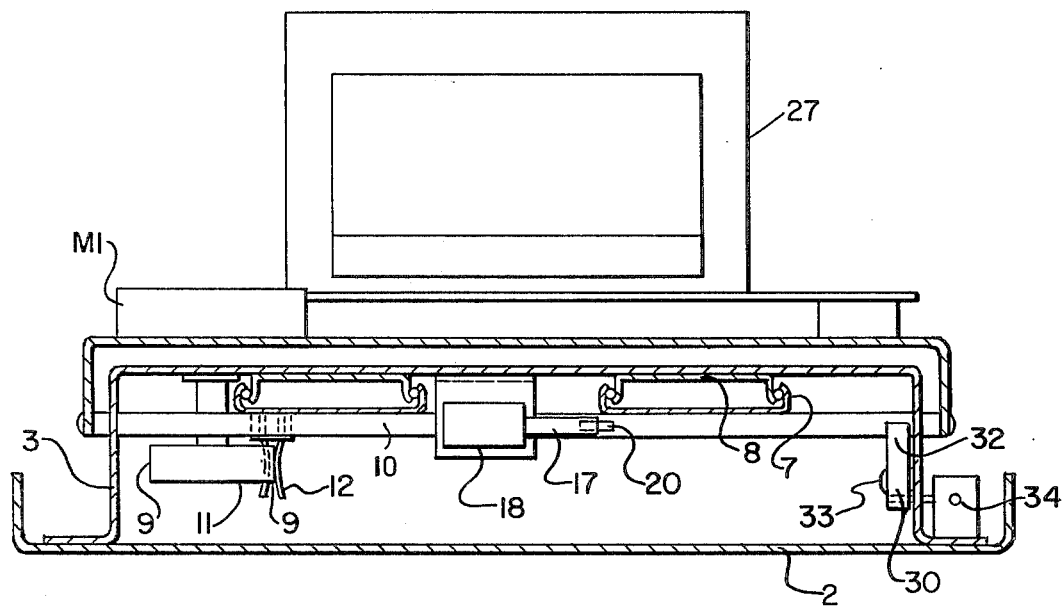
FIG. 4 is a front elevation of details of the transmitter.

As shown in FIG. 1, a facsimile scanner exemplary of the present invention comprises a main frame 1 including a base 2 and a chassis 3 for slidingly supporting a document carriage 4 with a top platen surface 6. A housing 5 encloses the frame and base. The carriage 4 has a transverse stringer 10 carrying shoes 7 sliding in tracks 8 on the chassis 3 (FIG. 4). A carriage motor M1 on the frame 1 drives a plastic belt 9 around an idler roll 11 (FIGS. 3 and 4). A spring clip 12 depending from the carriage stringer 10 frictionally grips the belt with slip coupling action which normally allows the motor to drive the carriage linearly from its inner position shown in FIGS. 1 to 4 to its outer position shown in FIG. 5, but which allows the carriage to be moved manually from its outer position independently of the motor when stopped or running.

Figure 5:
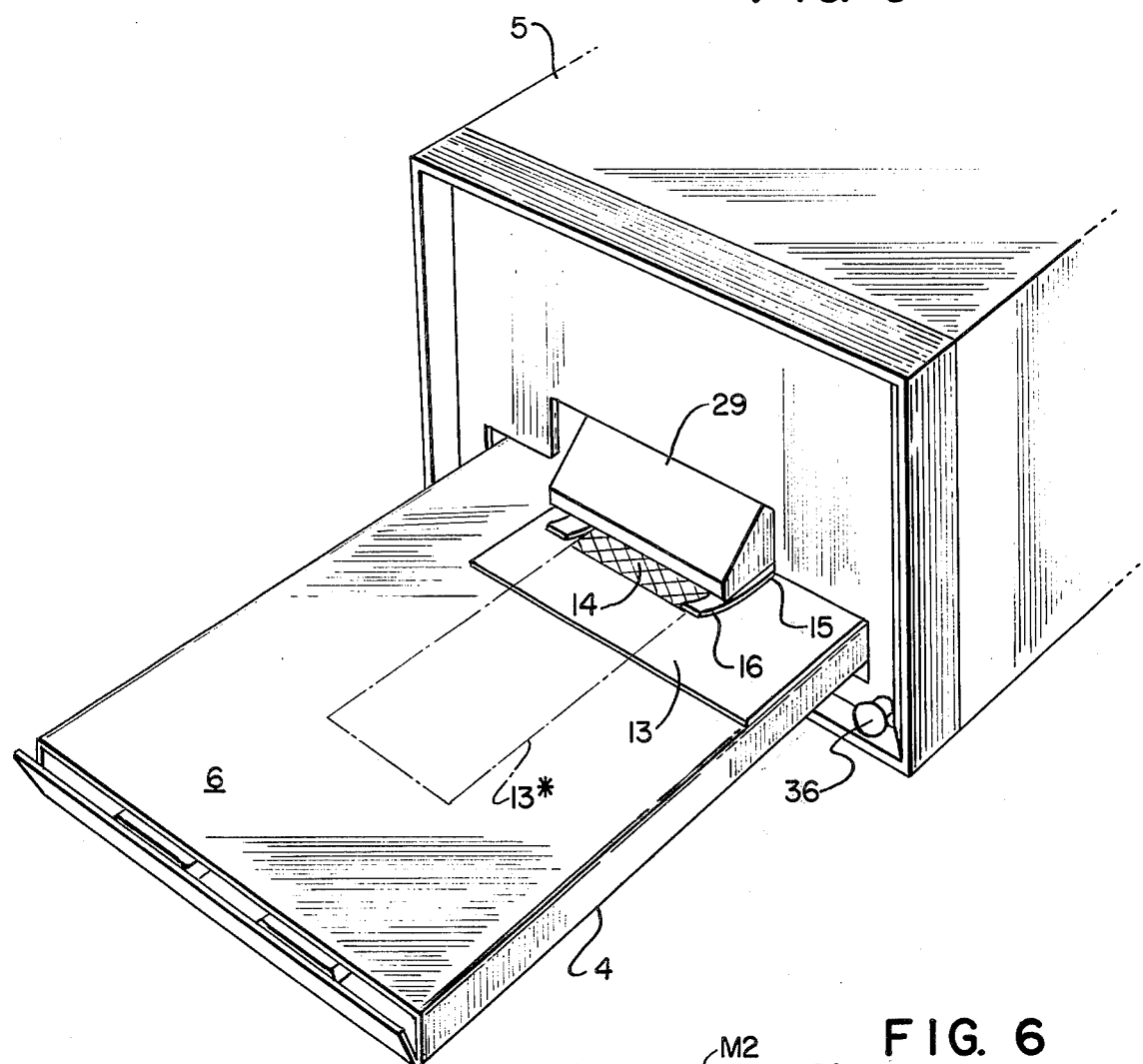
FIG. 5 is an isometric view showing the transmitter with its graphic record carriage in outer position.

On the top platen surface 6 of the carriage 4 is a spring detent 15 for receiving and clipping flatwise a document 13 such as a signature card with a signature area 14 indicated by cross hatching. The detent 15 has arms 16 which serve as a frame for the signature area or any other selected area of a document. For facsimile transmission of a selected area the document is inserted under the detent face up with the selected area framed by the detent or other indexing marks on the platen. The carriage 4 is in its outer position shown in FIG. 5 prior to transmission and the face up area 14 framed by the detent is easily visible to the operator as shown in FIG. 5.

Figure 6:
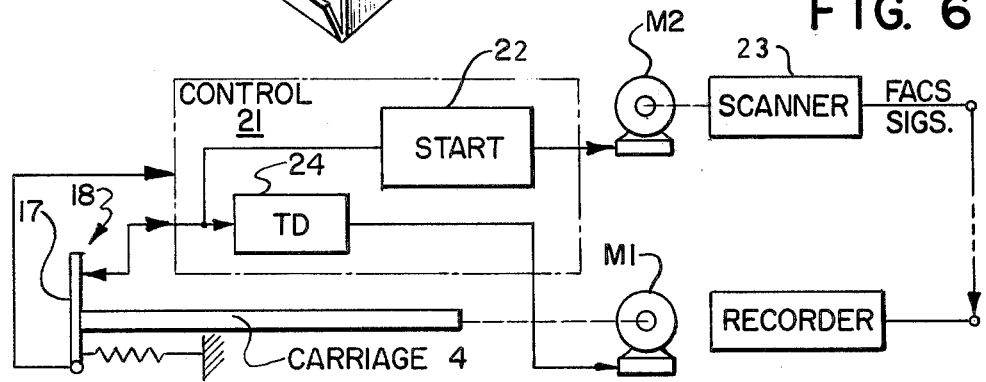
FIG. 6 is an electrical wiring diagram.

In its outer position an abutment 20 on the carriage under the chassis 3 (FIGS. 3 and 4) engages the spring urged finger 17 of a microswitch 18 mounted under the chassis, holding the microswitch in open position as shown in FIG. 6. To start transmission of a document held by the detent 15 on the carriage platen 6, the carriage is manually pushed toward inner position allowing the microswitch to close and complete a circuit to a scanner control circuit 21. The control circuit includes a scanner start circuit 22 controlling a motor M2 driving a rotary facsimile scanner 23. The start circuit starts the rotary scanner, which in a well known manner transmits framing pulses to the remote facsimile recorder. An approximately three second period is allowed for the recorder to synchronize its rotation with that of the scanner. The scanner control circuit also includes a time delay circuit 24 which delays energization of the carriage motor M1 for the synchronization period. The motor then drives the carriage back to its outer position carrying the document on the carriage platen in a planar path under a scanning assembly 26.

The scanning assembly 26 includes a scanning head 27 enclosing a photoelectric tube 28, and rotary helical or spiral scanning mechanism, not shown but well known in the facsimile art. The photoelectric tube 28 and its associated lenses view the carriage platen 6 through a hood 31 along a plane P folded by a mirror 29 to a scan line L extending transversely of the carriage platen (FIGS. 2 and 3). Thus as the document 13 moves outward with the carriage it is scanned line by incremental line by the scanner, and facsimile signals representative of the document are produced at the output of the scanner 23.

Since the scanning apparatus so far described is generally capable of scanning a whole document as well as a selected portion thereof it would be wasteful to limit the scanning capability to an area smaller than a whole document. On the other hand, in large volume transactions such as check cashing there is no time or need to scan a whole document. In the present apparatus a selected area of a document can be scanned in a minimum of time or, alternatively a whole document can be scanned.

To limit scanning to the selected area an adjustable stop 30 in the shape of a bell crank with a nose 32 is pivotally mounted at 33 on the side of the chassis 3. A tie rod 34 extending from a front panel knob 36 to the stop 30 adjusts the nose 32 of the stop between the vertical position shown in FIGS. 2, 3 and 4 to a horizontal position. In its vertical position the stop nose 32 is in the path of a lug 37 under the carriage 4 where it arrests inward movement of the carriage such that the selected document area 14 lies just outside the scanning line L. Thus when the carriage is driven on its scanning movement outwardly only the selected area is scanned before the carriage abutment 20 engages the microswitch 18 and stops carriage drive and scanning. Typically the selected area is one half an inch lengthwise of the carriage, the stop 30 being equally spaced from the lug 37. Scan of a one half inch area can be completed in eleven seconds, whereas a complete document six inches long would require 1.7 minutes.

The full document can, however, be transmitted by manual adjustment of the stop to horizontal position out of the path of the carriage lug 37. The carriage may then be pushed to the innermost position for a scan of nine inches substantially the full length of the platen. A document 13* of intermediate length may be scanned in less than the time for the longest document by pushing the carriage only part way toward innermost position, the depth to which the carriage should be pushed being indicated by the framing arms 16 or other index marks.

Thus various areas of a document beyond a selected area may be scanned at the operator's choice, while providing an automatic selection of a limited area for the fastest transmission.

It should be understood that the present disclosure is for the purpose of illustration only and that this invention includes all modifications and equivalents which fall within the scope of the appended claims.

We claim:

1. Facsimile apparatus for transmitting an electrical signal representative of a selected face portion of a graphic record comprising:
   a frame member,
   means on the frame member for scanning the graphic record,
   a carriage member moveable linearly between inner and outer positions on the frame member, the carriage member having framing means for locating the graphic record flatwise on a planar path passing the scanning means, the carriage member being below the scanning means and the whole framing means being exposed when the carriage is in outer position so that the graphic record is visible face up when located in the framing means by the operator, and means to limit the movement of the carriage on its path such that a selected length of the record in the direction of carriage movement is scanned.

2. Facsimile apparatus according to claim 1 wherein the carriage extends transversely of its movement beyond the scanning means so that portions of records of different sizes may be selectively located and scanned.

3. Apparatus according to claim 2 including means to limit the movement of the carriage on its path such that a selected length of the record in the direction of carriage movement is scanned, whereby two dimensions of the record portion are selected for scanning.

4. Facsimile apparatus for transmitting an electrical signal representative of a selected portion of a graphic record comprising:
   a frame member,
   means on the frame member for scanning the graphic record,
   a carriage member moveable linearly between inner and outer positions on the frame member, the carriage member having framing means for locating the graphic record flatwise on a planar path passing the scanning means,
   a motor for driving the carriage member between positions,
   switch means on one member for starting and stopping the motor,
   means on the other member for actuating the switch means when the carriage member is moved toward its inner position, and
   means on the frame member limiting inward movment of the carriage member, the limiting means being spaced from the carriage outer position by the scanned dimension of the selected record portion.

5. Apparatus according to claim 4 including means for adjusting the limiting means from carriage movement limiting position so as to allow scan of the record beyond the selected portion.

6. Apparatus according to claim 4 wherein the framing means is exposed outside the frame member when the carriage member is in outer position.

7. Apparatus according to claim 4 including a slip coupling between the motor and carriage member allowing movement of the carriage member from outer toward inner position independent of the motor.

8. Apparatus according to claim 7 wherein the actuator operates the switch upon said carriage movement to start the motor drive.

9. Apparatus according to claim 4 including control means responsive to the switch means to start operation of the scanning means.

10. Apparatus according to claim 9 including means to delay starting of the motor.

* * * * *